Feb. 26, 1924.
W. H. OVERHOLSER
AUTOMOBILE JACK
Filed Oct. 23, 1922    2 Sheets-Sheet 1
1,485,286
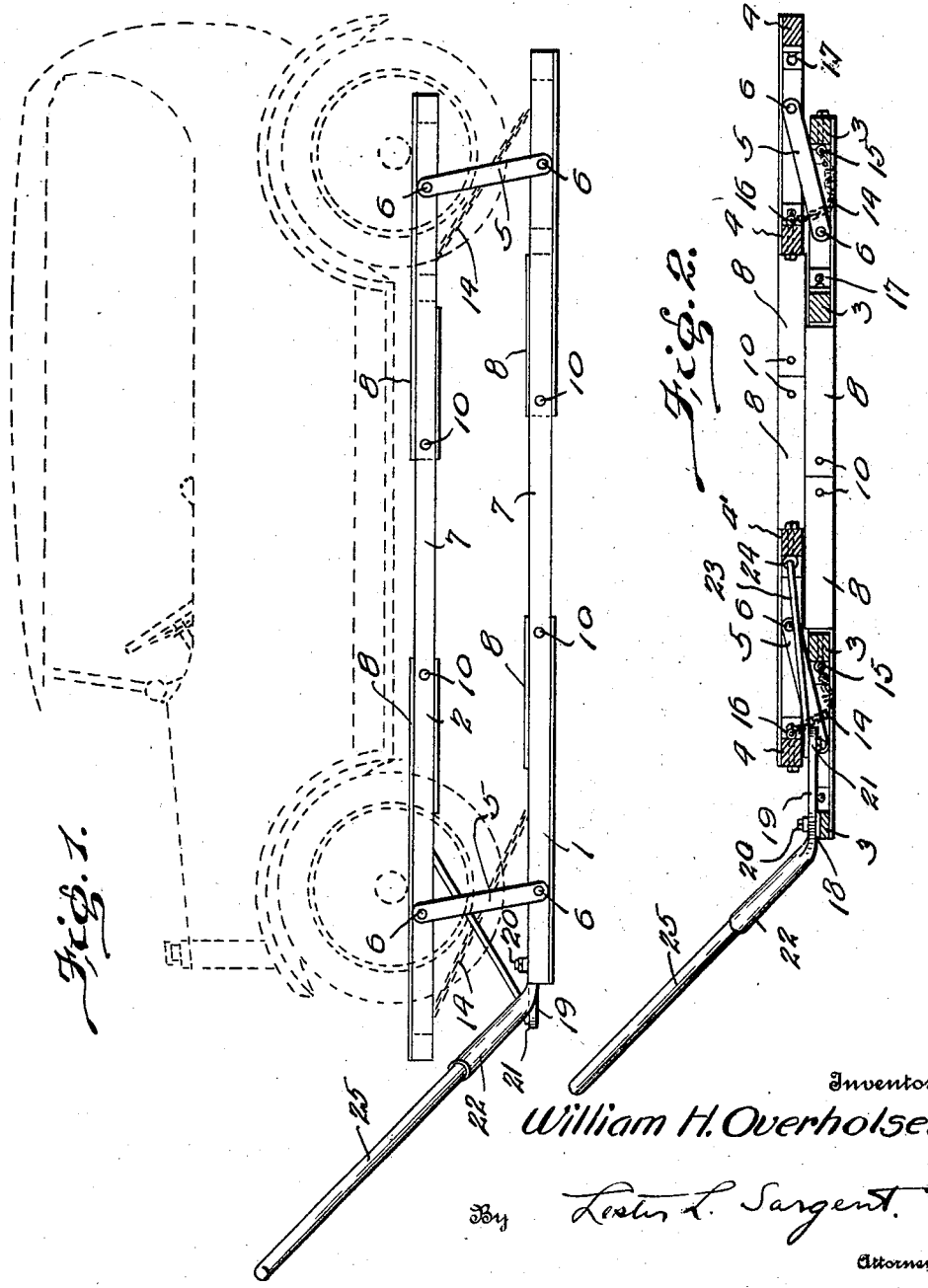
Inventor
William H. Overholser
By Lester L. Sargent
Attorney

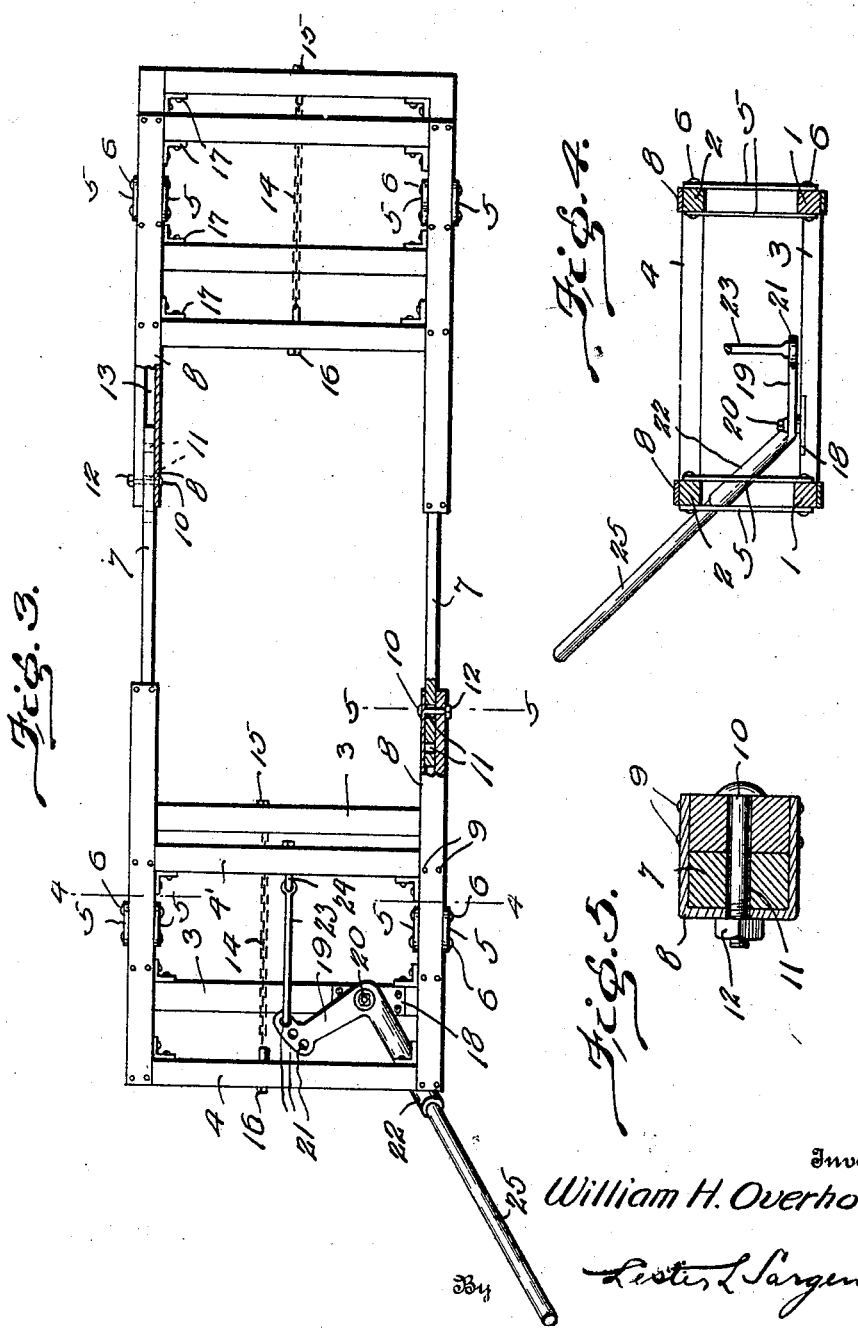

Patented Feb. 26, 1924.

1,485,286

UNITED STATES PATENT OFFICE.

WILLIAM H. OVERHOLSER, OF CHURUBUSCO, INDIANA.

AUTOMOBILE JACK.

Application filed October 23, 1922. Serial No. 596,406.

*To all whom it may concern:*

Be it known that I, WILLIAM H. OVERHOLSER, a citizen of the United States, residing at Churubusco, in the county of Whitley and State of Indiana, have invented a new and useful Automobile Jack, of which the following is a specification.

The object of my invention is to provide an improved automobile jack which is capable of adjustment for different sizes of automobiles; to provide a machine on which repairs may readily be made; and to provide a machine having a novel and improved construction and mode of operation. I attain these and other objects of my invention by the mechanism illustrated in the accompanying drawings in which—

Figure 1 is a side elevation of the device in use;

Fig. 2 is a longitudinal section through the device;

Fig. 3 is a top plan view of the machine, partly in section;

Fig. 4 is a transverse section on line 4—4 of Fig. 3; and

Fig. 5 is a section on line 5—5 of Fig. 3.

Like numerals indicate like parts in each of the several views.

Referring to the accompanying drawings, I provide a lower jack frame having short longitudinal front and rear bars 1 and a U-shaped metal plate 8 attached to said bars with screws or other fastening members 9 and forming the channels 13. I provide an intermediate telescoping bar 7 slidably mounted in the channels 13 and detachably secured to bars 2 and plates 8 by bolts 10 and nuts 12, as shown in Fig. 3. I provide upper frame bars 2 and plates 8 of identical construction with that of the lower frame bars just described above and having similar telescoping bars 7 adjustably mounted in the similar channels 13. I provide links 5 operatively connecting the upper frame and the lower frame, said links being pivotally attached to the respective bars 1 and 2 by suitable bolts or pivots 6. As shown in Fig. 3, bolts 10 extend through the openings 11 in telescoping bars 7, these openings 11 being of slightly greater diameter than the bolts 10 to permit of readily extending the frame to different lengths. I provide cross bars 3 to complete the lower frames and cross bars 4 to complete the upper frames, as shown in Figs. 2 and 3. These cross bars are braced to members 1 and 2 respectively, by suitable angle braces 17.

To limit the movement of the upper frame relative to the lower frame I provide suitable chains 14 attached to bolts or links 16 of the upper frame and bolts or links 15 of the lower frame, as shown in Figs. 2 and 3.

Mounted on the front cross bar 3 at one side of same I provide a swivel plate 18 on which is swivelly mounted shank 22 of the operating lever 25 by means of a suitable pivot 20. Operating lever or shank 22 is provided with a right angled extension 19, in the end of which are a plurality of spaced orifices 21 for adjustably engaging the hooked end of link 23. The opposite end of that link is engaged in the eye of the eye-bolt 24 which is affixed to the second or rearward cross bar 4' of the upper frame.

In operating the jack the lever 25 is pushed outward away from the machine, thus swinging its angled extension 19 forward and by means of the connection of link 23 with cross piece 4 of the upper frame, pulling the upper frame into an elevated position, such for example as that shown in Fig. 1. The upward and forward movement of the upper frame is limited by the chains 14. The range of the operating lever may be adjusted by adjusting the connection of link 23 to any of the several spaced orifices 21 in the angular extension 19 of the operating lever, as will be understood by reference to Fig. 3.

The jack may be adjusted for use with automobiles of different makes by adjusting the respective intermediate telescoping bars 7 relative to the short bars 1 of the lower frame or relative to the short bars 2 of the upper frame, as will be understood by reference to the sectional portions of Fig. 3.

The device is one that can be driven on easily with any automobile and it can then be readily operated to raise the automobile to the desired height for convenience in making repairs. I may make the various parts of any suitable dimensions and material.

What I claim is:

1. In an automobile jack, the combination of an upper frame and a lower frame, each of said frames comprising a plurality of longitudinal bars having U-shaped metal plates affixed thereto and having channels between the bars and the plates, telescopic bars slidably mounted in said channels, said telescopic bars having a plurality of spaced orifices, bolts adjustably securing said telescopic bars to the first named bars and plates to permit of adjustably lengthening or shortening the two frames, cross bars affixed to the respective longitudinal bars other than the telescopic bars, an operating lever mounted on the forward cross bar of the lower frame, and means adjustably connecting the said lever with a rearward cross bar of the upper frame for operating the upper frame to an elevated position.

2. In an automobile jack, the combination of an upper frame and a lower frame, each of said frames comprising a plurality of longitudinal bars having U-shaped metal plates affixed thereto and having channels between the bars and the plates, telescopic bars slidably mounted in said channels, said telescopic bars having a plurality of spaced orifices, bolts adjustably securing said telescopic bars to the first named bars and plates to permit of adjustably lengthening or shortening the two frames, cross bars affixed to the respective longitudinal bars other than the telescopic bars, an operating lever mounted on the forward cross bar of the lower frame, means adjustably connecting the said lever with a rearward cross bar of the upper frame for operating the upper frame to an elevated position, and means operatively connecting the upper and lower frames to limit the movement of the upper frame relative to the lower frame.

WILLIAM H. OVERHOLSER.